United States Patent
Balabon

(10) Patent No.: US 7,921,054 B2
(45) Date of Patent: *Apr. 5, 2011

(54) SYSTEM AND METHOD FOR BLOCK TRADING

(75) Inventor: Sam Balabon, Houston, TX (US)

(73) Assignee: Deep Liquidity, Inc., Austin, TX (US)

(*) Notice: Subject to any disclaimer, the term of this patent is extended or adjusted under 35 U.S.C. 154(b) by 77 days.

This patent is subject to a terminal disclaimer.

(21) Appl. No.: 11/821,988

(22) Filed: Jun. 26, 2007

(65) Prior Publication Data

US 2008/0015974 A1      Jan. 17, 2008

Related U.S. Application Data

(63) Continuation-in-part of application No. 11/191,046, filed on Jul. 28, 2005, and a continuation-in-part of application No. 10/840,378, filed on May 7, 2004, and a continuation-in-part of application No. 10/730,360, filed on Dec. 9, 2003, now Pat. No. 7,076,461.

(60) Provisional application No. 60/431,913, filed on Dec. 9, 2002, provisional application No. 60/830,320, filed on Jul. 12, 2006, provisional application No. 60/841,508, filed on Aug. 31, 2006.

(51) Int. Cl.
*G06Q 40/00*      (2006.01)

(52) U.S. Cl. ........................................................ 705/37

(58) Field of Classification Search .................. None
See application file for complete search history.

(56) References Cited

U.S. PATENT DOCUMENTS

| | | | | |
|---|---|---|---|---|
| 5,799,287 A * | 8/1998 | Dembo | .................. | 705/36 R |
| 6,519,574 B1 * | 2/2003 | Wilton et al. | ............... | 705/35 |
| 6,601,044 B1 * | 7/2003 | Wallman | .................. | 705/36 R |
| 7,177,836 B1 * | 2/2007 | German et al. | ............ | 705/40 |
| 7,181,425 B1 * | 2/2007 | Cha | ........................ | 705/37 |
| 7,263,502 B1 * | 8/2007 | Ramaswami et al. | ...... | 705/35 |
| 7,389,268 B1 * | 6/2008 | Kemp et al. | ................ | 705/39 |

(Continued)

OTHER PUBLICATIONS

Anonymous; ISO "AMPs" Up New Market Rules; Busines Wire; Oct. 2002.*

(Continued)

*Primary Examiner* — Alexander Kalinowski
*Assistant Examiner* — Virpi H Kanervo

(57) ABSTRACT

A method and system for trading financial instruments which reduces the leakage of trading interest when buyers and sellers of financial instruments desire to trade. Accordingly, in one embodiment, a trading system allows traders to speculate on the hidden liquidity in the market by offering liquidity at fixed prices which are inferior to the NBBO (National Best Bid Offer) in exchange for rights to sweep the market for better priced quotes. In another embodiment of the invention, a liquidity provider can set their own fee. This fee is charged to the liquidity taker if their quote is executed. This fee compensates traders for the risk of taking a position in a financial instrument. In another embodiment of the invention, dummy orders are used to reduce trading interest leakage when limit orders are placed into order books. In another embodiment of the invention, a trading system will only match liquidity taking orders with single liquidity providing orders of equal or greater in size.

2 Claims, 1 Drawing Sheet

U.S. PATENT DOCUMENTS

Figure 1:
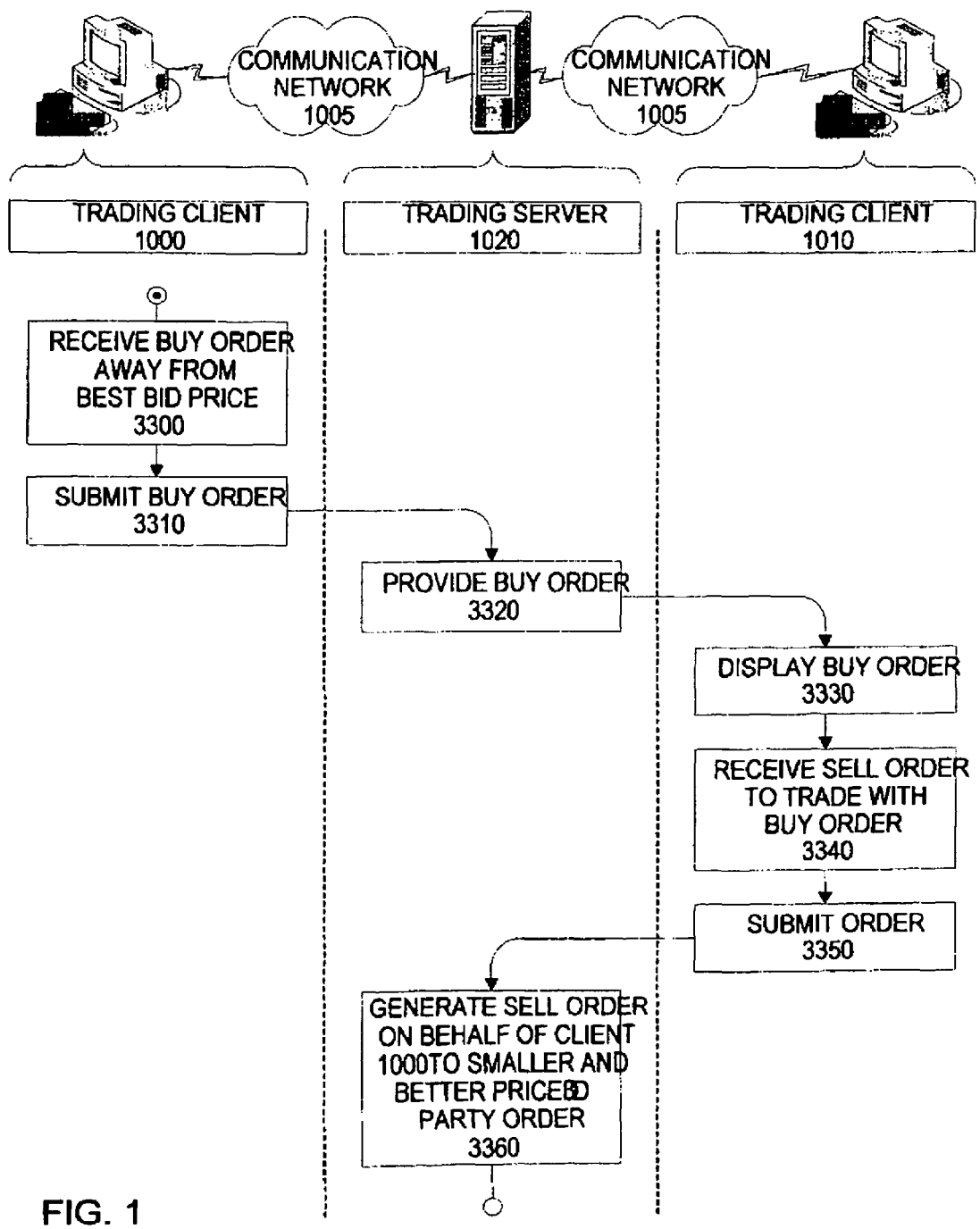

| | | | |
|---|---|---|---|
| 7,415,432 B1 * | 8/2008 | Gianakouros et al. | 705/36 R |
| 7,590,587 B2 * | 9/2009 | Duquette | 705/37 |
| 2001/0044767 A1 * | 11/2001 | Madoff et al. | 705/37 |
| 2002/0152153 A1 * | 10/2002 | Nakagawa | 705/37 |
| 2002/0156722 A1 * | 10/2002 | Greenwood | 705/37 |
| 2004/0024689 A1 * | 2/2004 | Zhou et al. | 705/37 |
| 2004/0107161 A1 * | 6/2004 | Tanaka et al. | 705/38 |
| 2004/0143538 A1 * | 7/2004 | Korhammer et al. | 705/37 |
| 2005/0262003 A1 * | 11/2005 | Brumfield et al. | 705/37 |
| 2007/0043649 A1 * | 2/2007 | Howorka et al. | 705/37 |
| 2009/0292638 A1 * | 11/2009 | Hausman | 705/37 |

OTHER PUBLICATIONS

Benoff, Dave; Maintenance Cost Control Programs: Options for Maintenance Insurance Expand into New Areas; Business & Commercial Aviation; vol. 87, No. 2, p. 91; Aug. 2000.*

Nguyen, Trien Tien; General Equilibrium under Price Controls; The University of Western Ontario; vol. 4305A of Dissertations Abstracts International, p. 1636; 1981.*

* cited by examiner

SYSTEM AND METHOD FOR BLOCK TRADING

CROSS REFERENCE TO RELATED APPLICATION

This application claims the benefit under 35 U.S.C. §119(e) of U.S. Provisional Application No. 60/830,320 filed Jul. 12, 2006 and U.S. Provisional Application No. 60/841,508 filed Aug. 31, 2006. This application is a continuation-in-part of U.S. patent application Ser. No. 11/191,046, filed Jul. 28, 2005. This application also claims the benefit under 35 U.S.C. §119(e) of U.S. Provisional Application No. 60/639,374, filed Dec. 23, 2004. This application is also a continuation-in-part of U.S. patent application Ser. No. 10/840,378, filed May 7, 2004. This application is also a continuation-in-part of U.S. patent application Ser. No. 10/730,360, filed Dec. 9, 2003, now U.S. Pat. No. 7,076,461 which claims the benefit under 35 U.S.C. §119(e) of U.S. Provisional Application No. 60/431,913, filed Dec. 9, 2002. U.S. patent application Ser. No. 10/840,378 and U.S. patent application Ser. No. 10/730,360 are hereby incorporated by reference, as if repeated herein in their entirety, including their drawings.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF INVENTION

Buyers and sellers of large amounts of securities must use extreme care in acquiring or disposing of their large blocks of equities.

One of the more popular trading methods used for block trading is placing limit orders in dark liquidity pools. These orders wait for contra orders of the same security to enter into the liquidity pools at which they are generally matched at or near the midpoint between the NBBO. Generally less than 10% of block orders can be crossed using this method because of the imbalance in trading interest. Imbalances in trading interest is what moves prices. The movement of prices generates liquidity.

Another method is for a customer to give the order to be worked by his broker. In another method the block order is broken up into smaller orders and entered into the market over time. There are problems with this method; computer programs can detect the order flow of the small orders coming into the market and route similar orders on the same side which increases trading costs. It also can be very costly if the market moves against the trader while he is working an order.

The main goal of a block trader is to achieve a good average execution price for his block of shares, at a price which has been least impacted by the trading interest generated by the working of his block. His goal is to efficiently communicate his order to other naturals without leaking his trading interest to unintended third parties.

Trading systems offer rebates to liquidity providers that supply limit orders to their order books. These rebates are set by the trading systems based on the amount of liquidity that is provided by the liquidity provider. With these trading systems the liquidity providers are unable to set their own rebates.

When large limit orders are displayed in order books, it creates a profitable trading opportunity for traders who place smaller limit orders which are slightly better priced than the larger limit orders. This forces traders who place large limit orders to break their limit orders into smaller orders, or place their large limit orders into an order book, but only display a small portion of their orders to the market. If current trading systems could prevent "penny jumping," it would allow traders to show much larger orders.

Most trading systems, when accepting a marketable limit order priced below market, will generally sweep down the book until the limit price is reached or the order is filled. In conducting the sweep these trading systems include all sizes of limit orders using price priority and do not target limit orders of equal or greater in size.

There is a need in the art for a trading system that can trade block orders more efficiently.

SUMMARY OF THE INVENTION

Accordingly in one embodiment liquidity providers are able to determine their own fee for each limit order they place in the trading system. When a trade is executed, the trading system collects the fee from the liquidity taker and credits the liquidity provider. This adds a cash component to a limit order. "I will trade with you at a given price providing you pay me 15 cents a share." The amount of fee is directly proportional to the level of risk of buying or selling a position in the market, and generally the higher the fee, the greater the size. This creates a marketplace of limit orders containing different sizes and levels of fees.

The invention allows a liquidity provider to set his own fee on a per share (unit) basis which is charged to liquidity taker and paid to the liquidity provider when a trade is executed. The liquidity provider enters a dollar amount, e.g., 3 cents per share which he needs to be credited to his account if his limit order is executed. The cash component is incorporated into the limit order.

The trading system reduces volatility created by market impact of large orders entering the market. This occurs because cash is exchanged for liquidity instead of forced market interaction to obtain liquidity.

Brokers have different commission rates for different customers. In many cases when orders are received at brokers, their internal systems score the value of the customer to the firm, and then the orders receive a yes or no from the firm's internal proprietary trading system if the firm will take the other side of the trade with the firm's money. The broker's proprietary trading system identifies trading opportunities as customer's orders flow through it. One advantage of the invention, is that many brokers' proprietary trading systems already calculate anticipated commission revenue (the commission rate specific to each customer) into the decision-making process, if the broker wants to take the other side of the trade. With the invention, brokers could openly advertise the trading interest generated by their proprietary trading systems. This allows brokers to advertise the latent liquidity that sets in their trading systems to non-customers and earn the same level of revenue for supplying the liquidity to their own customers. This opens a new window to additional liquidity for the market.

In another embodiment of the invention provides for a system and method that allows traders to place and trade a new type of limit order which reduces slippage while providing an incentive to place and show size. An additional embodiment allows the liquidity provider to offer liquidity to the market, priced inferior to the NBBO, in exchange for receiving instant profits on at least a portion of his order.

Accordingly in one embodiment, a trading system receives a buy limit order from a liquidity provider. The buy limit order contains a number of shares and a desired profit margin. The liquidity offered by the buy limit order is combined with the aggregate liquidity in the market to create a combined quote.

The trading system calculates the price of the combined quote by meeting the liquidity provider's preset profit margin based on the displayed and estimated hidden liquidity in the market. The shares of liquidity provider's limit order are added to all the aggregated total displayed shares in buy limit orders displayed throughout the market, priced from the national best bid price down to the price of the liquidity provider's buy limit order. The sum of the shares of the liquidity provider's buy order and the displayed shares are combined into one quote which is displayed in the trading system. The price and size of the combined quote floats at different price levels below the NBBO, depending on the amount of profit that can be made by an intermarket multi-priced sweep of all equal and better priced buy limit orders compared to the fixed price and shares of the combined quote.

When the trading system matches the combined quote with an order sent by a liquidity taker, the trading system initiates a multi-priced intermarket sweep sending sell orders to all known market centers which are displaying buy limit orders at prices equal or greater than the liquidity provider's buy order. The number of shares swept is up to the total amount of the shares in the combined quote. The sweeping techniques of the trading system may include estimating hidden liquidity in different market centers and waiting for confirmations to come back to the trading system before routing additional orders where liquidity was located.

In another embodiment of the invention the trading system continually tracks all displayed quotes which are equal to or better priced than the liquidity provider's combined quote price. After an intermarket sweep is conducted, the trading system scans the market to determine if any of the quotes used in the construction of the combined quote were not obtained in the sweep. If any of the quotes used to construct the combined quote were not obtained in the sweep, then the fills obtained in the sweep are credited to the liquidity taker, not the liquidity provider, and no execution occurs with the combined quote. The amount of shares contributed to the combined quote by the liquidity provider is dependent on the success of the intermarket sweep. The more shares found in reserves during the intermarket sweep, the fewer shares the liquidity provider will need to contribute to the transaction, and the more profit he makes by flipping the shares to the liquidity taker at a single price of the combined quote. It is possible that the liquidity provider may not have to contribute any shares to the combined quote if there are enough shares found in the reserves during the intermarket sweep. Once the trading system has matched a liquidity-taking quote with a combined quote, the trading system may delay the execution while it scans the market to determine if the liquidity taker is simultaneously routing liquidity-taking orders. If it is determined that simultaneous orders are entering the market the matched orders of the liquidity taking quote and the combined quote will cancel the execution and attempt to match the orders again providing the new prices fall within the price boundaries of the buyer's and seller's orders.

Another embodiment of the invention (the trading system) counts up the shares obtained in the sweep and counts up the shares of the quotes used in the construction of the combined quote. If the number of shares obtained in the sweep is less than the number of shares of the quotes used in the construction of the combined quote, the fills obtained from sweep are credited to the liquidity taker. In general, analyzing the results of a sweep can determine if liquidity provider or the liquidity taker is credited with the sweep. This can be used for general pegging of orders that are priced inferior to those marked up to the NBBO. If the quote or quotes used to determine the price point of the peg are not obtained by the sweep, then the fills of the sweep are credited to the liquidity taker, thus preventing the liquidity taker from executing with one of the trading system's quotes. These embodiments in the invention afford the liquidity providers the ability to condition the execution of their quotes based on a stable market. It creates an unwritten agreement between the buyer and seller, i.e., "I will provide size to you at a preset price providing you give me first access to the market at the same time or immediately after we trade."

The number of shares contributed to the combined quote by the liquidity provider is dependant on the success of the intermarket sweep. The more shares found in reserves during the inter-market sweep, the fewer shares the liquidity provider will be obligated to contribute to the transaction, and the more profit he makes by flipping the shares to the liquidity taker at a single price of the combined quote. It is possible that the liquidity provider may not have to contribute any shares to the combined quote if there are enough shares found in the reserves during the intermarket sweep. A buy combined quote is always priced inferior to the NBBO. Executions occur generally in a few seconds, but could occur in a number of milliseconds, depending on how fast confirmations are received from the various market centers. It is also possible executions could occur over several minutes if the trading system extends the matching and execution process.

The trading system sweeps the market at multiple prices for the liquidity provider and the liquidity provider resells all the purchased shares at one price to the liquidity taker. The liquidity provider gets instant profits for providing additional liquidity to the market. In some cases the liquidity provider will be able to purchase enough reserve shares in the sweep to flip his entire order to the liquidity taker and make an instant profit without providing any liquidity at all.

Example: The liquidity taker identifies a buy combined quote priced inferior to the NBBO that he wants. He understands he will be trading at an inferior price to the NBBO. In order for him to trade with the combined quote, he must not simultaneously route same-side sell orders throughout the market. If he does, the trading system will fail to get the minimum amount of shares in the intermarket sweep required to complete his execution with the combined quote. A liquidity taker only hurts himself if he tries to game the trading system.

The invention allows liquidity providers to speculate on the hidden liquidity in the market and gives liquidity takers access to quotes which are larger than what are available in the market.

The invention provides a new way for deep pocket quantitative "informed" traders to communicate to large buy-side institutions and large speculative traders.

Accordingly in one embodiment, a trading system receives from a liquidity provider a buy limit order consisting of a share quantity range, estimated reserve percentage and target profit percentage. The trading system dynamically adjusts the shares and price of the combined quote so that the target profit percentage can be efficiently achieved on all obtained shares. The ultimate goal of pricing the combined quote is to insure that after a trade has been completed, the liquidity provider retains a number of shares within or below the designated share quantity range, and that the target profit percentage is achieved on all of the retained shares.

In order to achieve a profit on this type of transaction, the shares must be priced outside the NBBO. Once a trade is matched for execution outside the NBBO, a profit can be made by sweeping some or all of the shares to be delivered from orders displayed in any market that are priced closer to the NBBO than the trade execution price of the combined quote. Obtaining these shares at different prices from other markets is referred to as a "multi-priced intermarket sweep." In addition to the displayed liquidity, profits can also be produced when hidden reserve shares are encountered during the intermarket sweep. The liquidity provider designates the estimated reserve percentage during order entry. The reserve percentage is the percentage of the estimated shares that are hidden, divided by the total displayed shares. Given these displayed shares and their estimated reserves, the system calculates the optimal price and shares to achieve the target profit percentage on all retained shares. This optimal share quantity may be capped below the optimal level based on the designated share range and the displayed liquidity. While this adjustment does limit the liquidity provider's risk, this share maximum creates a slightly non-optimal price/share combination.

The result of the trading system's dynamic order algorithm is a combined quote (a very large limit order) at the optimal price and shares that will allow the system to obtain sufficient shares through a multi-priced intermarket sweep to fill a liquidity taker's order, while leaving the liquidity provider with a number of shares within or below the designated share range, all obtained at a profit equal to or better than the designated profit percentage—provided the estimated reserves are found.

When the trading system receives a liquidity-taking order, it matches against the orders displayed by both price and shares. The system chooses the best priced single order that will completely fill the liquidity taking order. When the system matches price and shares of a buy limit order with a sell order sent by a liquidity taker, the first step in executing the order is to attempt to obtain the maximum shares available in all markets at prices better than or equal to the limit price through a multi-priced intermarket sweep, sending sell orders to all known market centers to obtain the displayed buy orders, but also to discover any buy orders with hidden reserves. Depending on the result of this sweep, the transaction will produce different outcomes.

If the estimated reserve percentage is approximately correct, then the trade completes as expected. The liquidity provider sweeps a quantity of shares from all markets, adds his own shares and fills the liquidity taker's order. The resulting position by the liquidity provider is taken at a net discount to the NBBO such that his target profit percentage is achieved and his share range is not exceeded.

If the estimated reserve percentage is too low, then the trade completes with an added benefit to the liquidity provider. The liquidity provider sweeps more shares than expected from all markets, such that the total sweep shares are sufficient to fill the liquidity taker's order without an additional liquidity added. The liquidity provider retains no position, but does retain the cash profit generated by the difference between the limit price of the order and the average execution price of the sweep.

If the estimated reserve percentage is too high, the trade then completes, but the liquidity provider does not achieve his target profit. Due to the incorrect reserve estimates, the liquidity provider is able to fill the liquidity taker's order, but is unable to sweep sufficient better priced shares in other markets to achieve the profit required. The resulting position by the liquidity provider is still taken at a net discount to the NBBO, but not at a sufficient discount to meet his target profit percentage.

If the liquidity fluctuates such that the intermarket sweep does not generate sufficient shares to allow the liquidity provider to only retain shares within the designated share range, then the liquidity provider is omitted from the transaction. Instead of the liquidity provider obtaining the shares, adding his own, and using them to fill the liquidity taker's order, the entire quantity of sweep shares is given to the liquidity taker without any additional shares from the liquidity provider. This mechanism prevents the liquidity taker from harming the liquidity provider by simultaneously sweeping the same markets.

In another embodiment of the invention, other formulas can be used to determine the number of shares to be displayed to the market.

In yet another embodiment of the invention the limit price of the intermarket sweep may not be the limit price of the liquidity provider's order. The limit price of the intermarket sweep can be determined using multiple formulas based on criteria entered by the liquidity provider or inherent in the trading system's order type offerings Dummy Orders In still another embodiment, buy and sell trading interests are neutralized by the presence of dummy orders in the trading system. Dummy orders reduce market impact because market participants cannot tell the difference between a genuine order and a dummy order. Only when a firm order attempts to trade with a dummy order is the side revealed, and only to the party hitting the order. There are numerous ways dummy orders could be created, in one method the trading system can set a ratio of good orders to dummy orders, e.g., 10% of all orders in the order book are dummy orders. Even a small percentage of dummy orders can deter third parties from attempting to profit from the trading interest that is displayed in order books.

To prevent gaming, dummy orders can have a minimum fill requirement. This protects orders from being pinged from smaller orders which are used only to reveal the side of the larger order.

In a further embodiment, a computer program generates none or any number of dummy orders based on a number of market criteria such as number of orders already entered into the trading system, the size and symbol of the first party's order, volume, time of day price is pegged in relationship to the best ask price, and the dummy order price is pegged in relationship to the best bid price. The computer program can determine the number, size and price of dummy orders based in direct relationship to the orders already in the system. Dummy orders can be used to correct imbalances of trading interest that is displayed in the order book of the trading system. A computer program of the trading system can determine the generation of dummy orders when orders are entered into the trading system by trading participants.

Another embodiment of the invention,—trading participants of the trading system can create their own dummy orders.

In further embodiment of the invention is a trading system that ignores better priced orders and only will match a liquidity taking order with a contra order of equal or greater in size that is sitting in the trading system. This creates a new way of prioritizing orders based on their size rather than price as with current systems. It also prioritizes orders marked "trade at market" on what contra orders can be matched to them. It provides a means to match single limit orders that possess unique execution conditions with single individual liquidity taking contra orders.

Another embodiment of the invention is a computer-implemented method for trading above the market. The trading system receives from a first party a sell order at a price above the market value of a financial instrument, the market value based on an established market value indicator. First party's orders are displayed to the market and displayed via a user interface to a second party. The trading system receives a buy order by the second party at a particular price, equal to or greater than the price of the first party's sell order. The trading system completes the order by first party, buying at least one third party buy order at market value. The market value is based on the best offer in the market, but in different scenarios it could be based on the best bid or midpoint of the NBBO. In another embodiment the price of first party's order is pegged at a price distance away from the bid, ask or midpoint of the NBBO (National Best Bid and Offer).

In another embodiment of the invention, orders of the liquidity provider and liquidity taker are matched, but the actual trade does not occur until the trading system can verify that the liquidity taker did not conduct simultaneous trading in the same financial instrument at the moment he is matched with the liquidity provider. During the matching process the trading system scans the market for activity that would indicate simultaneous trading by the liquidity taker.

In another embodiment of the invention, the trading system will not execute a trade if the number of shares contained in the liquidity taking order is less than the displayed shares in various market centers at equal or better prices. This feature protects the liquidity taker from a bad fill.

Several embodiments of the invention are specifically illustrated and/or described herein. However, it will be appreciated that modifications and variations of the invention are covered by the above teachings and within the purview of the appended claims without departing from the spirit and intended scope of the invention. All buy transactions in the invention can be inversed to accommodate sell transactions and vice versa.

The invention claimed is:

1. A computer-implemented method for trading above a market, comprising:
    receiving by a computer a sell order by a first party to trade a financial instrument at a price above the market, the market to contain at least one sell order of a third party that is priced at the market;
    receiving by the computer a buy order by a second party to trade a financial instrument at a price above the market and at a particular price equal or greater than the price of the first party's sell order; and
    completing by the computer a trade between the first party and the second party at a price above the market and generating at least one buy order on behalf of the first party to trade the financial instrument with the third party that has a sell order that is smaller than the first party's sell order, and which is priced at the market.

2. A computer-implemented method for trading below a market, comprising:
    receiving by a computer a buy order by a first party to trade a financial instrument at a price below the market, the market to contain at least one buy order of a third party that is priced at the market;
    receiving by the computer a sell order by a second party at a price below the market and at a particular price equal or less than the price of the first party's buy order; and
    completing by the computer a trade between the first party and the second party at a price below the market and generating at least one sell order on behalf of the first party to trade the financial instrument with the third party that has a buy order that is smaller than the first party's buy order, and which is priced at the market.

* * * * *